C. A. THORPE.
TILE CUTTING MACHINE.
APPLICATION FILED DEC. 26, 1917.

1,313,213.

Patented Aug. 12, 1919.
4 SHEETS—SHEET 1.

Witness
Terll Freeman

Inventor
Clyde A. Thorpe
BY Orwig & Bair
Att'ys

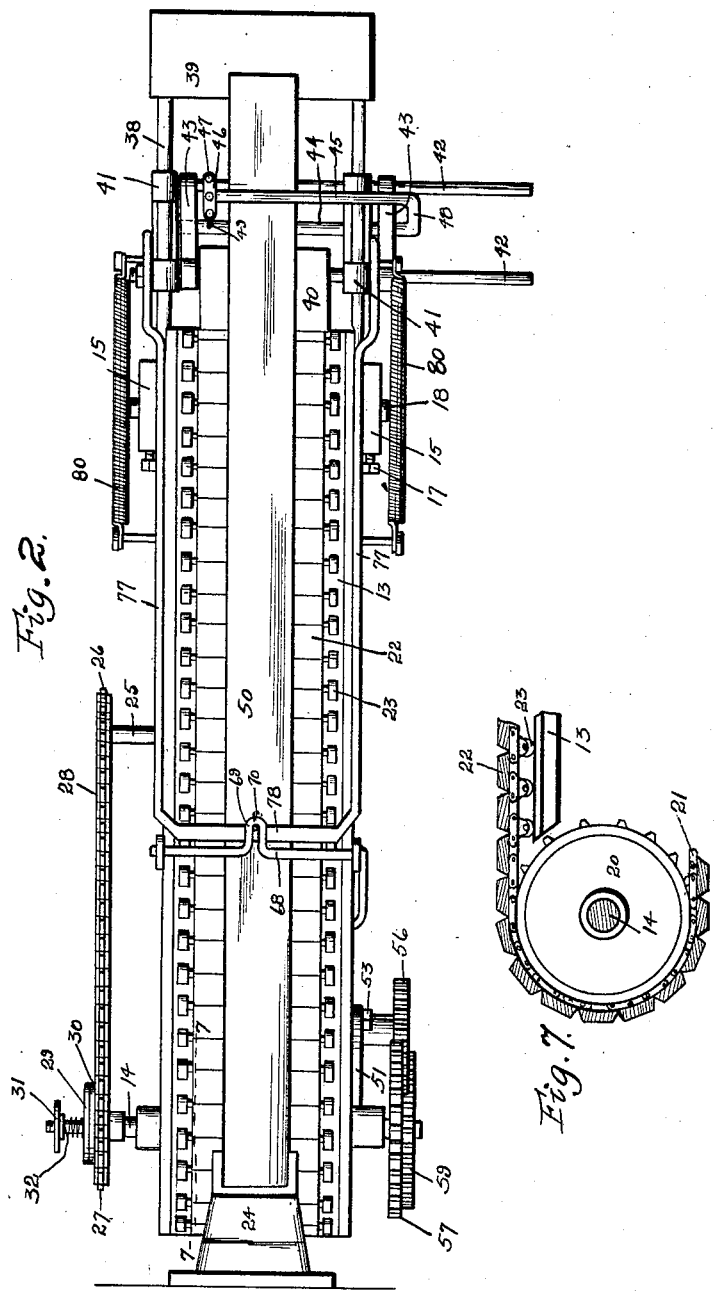

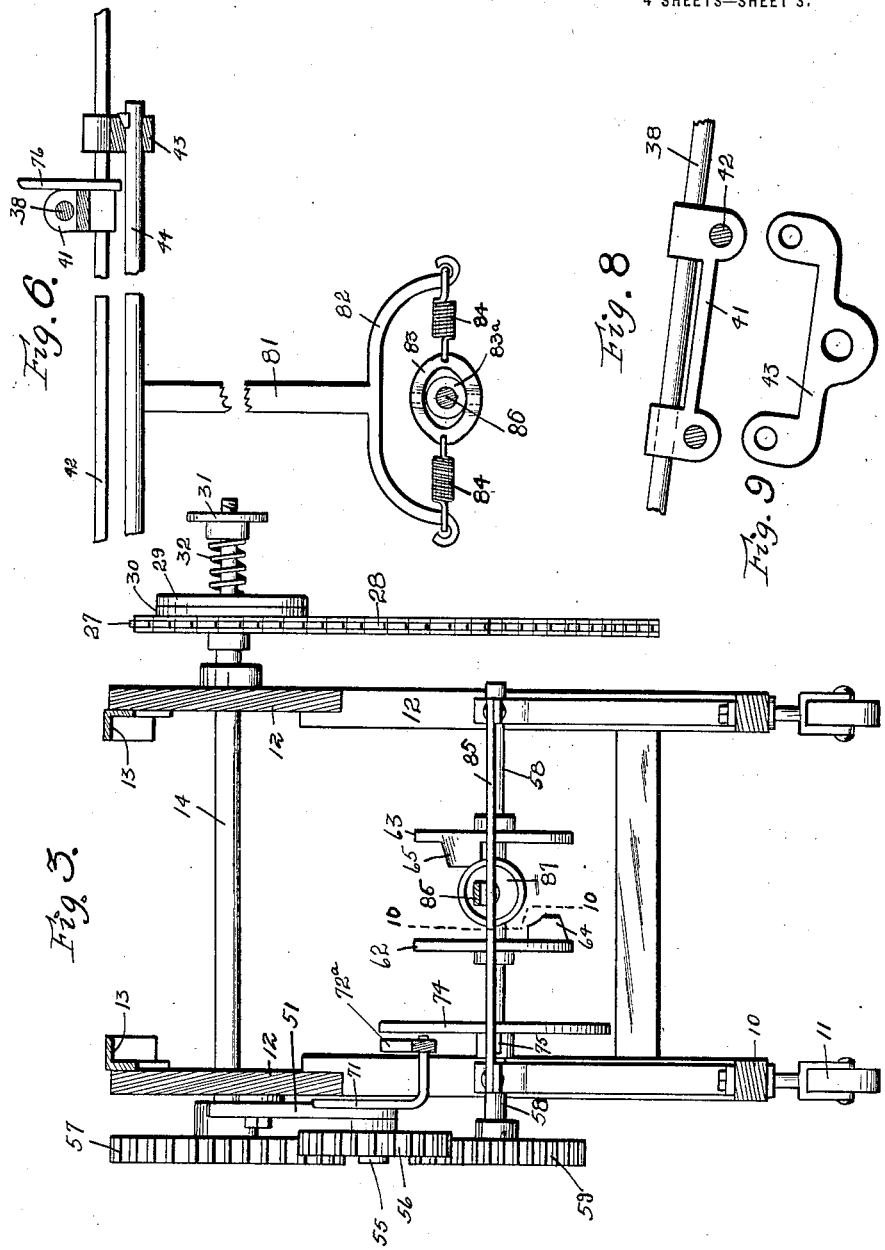

C. A. THORPE.
TILE CUTTING MACHINE.
APPLICATION FILED DEC. 26, 1917.
1,313,213.
Patented Aug. 12, 1919.
4 SHEETS—SHEET 4.
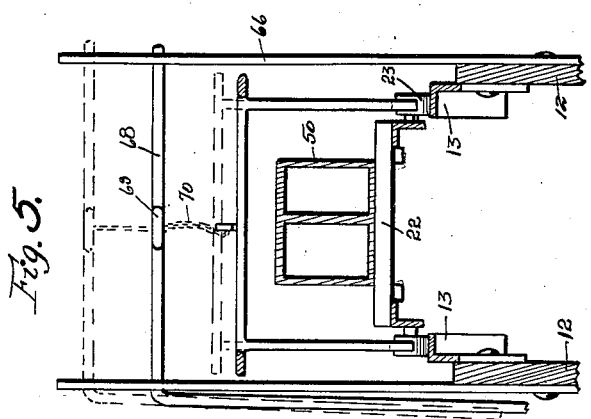
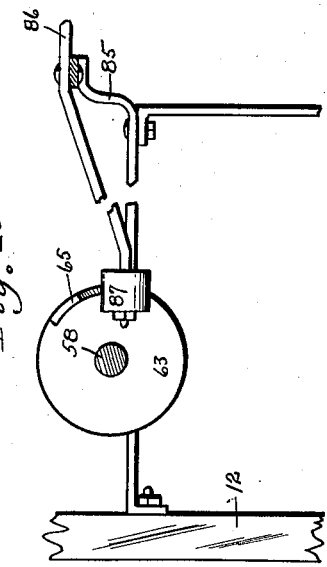
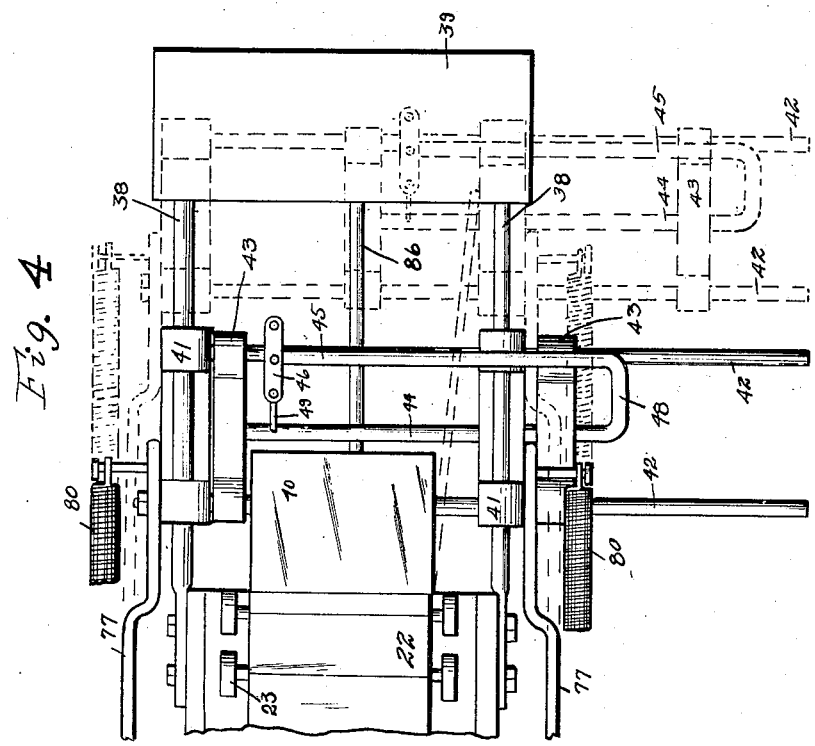

UNITED STATES PATENT OFFICE.

CLYDE A. THORPE, OF ADEL, IOWA.

TILE-CUTTING MACHINE.

1,313,213.        Specification of Letters Patent.        Patented Aug. 12, 1919.

Application filed December 26, 1917. Serial No. 208,848.

*To all whom it may concern:*

Be it known that I, CLYDE A. THORPE, a citizen of the United States, and resident of Adel, in the county of Dallas and State of Iowa, have invented a certain new and useful Tile-Cutting Machine, of which the following is a specification.

The object of my invention is to provide a tile cutting machine, of efficient construction having mechanism for cutting plastic material into tile.

Still a further object is to provide in such a machine, automatic mechanism for cutting material in the machine on lines transversely across the outer and inner faces of the tile, whereby no rough edges are left adjacent to said faces.

A further object is to provide such a machine having parts capable of being readily adjusted or substituted for varying the operation of the machine for cutting tile of different lengths.

Still a further object is to provide in such a machine, suitable mechanism adapted to cut the plastic material while the material is moving.

Still a further object is to provide in such a machine, means for shaping material for giving it curvature for making blocks of plastic material adapted for use in making circular structures, and to provide a curved movable support for said material adapted to move at the same rate of speed as material discharged from a die, and means for cutting said material on transverse lines while the material is moving, and to further so arrange said cutting means that it is automatically operated according to the speed of the moving material.

Still a further object is to provide a tile cutting machine having means for carrying a supply of plastic material, and means capable of reciprocating movement adjacent to the path of said material, and means carried by said last means adapted to travel transversely of the path of the material and including a cutting device for cutting the material on transverse lines while said first means is moving adjacent to and with the material.

A further object is to provide such a device having adjustable means for cutting the tile on different angles.

My invention consists in the construction, arrangement and combination of the various parts of the device, whereby the objects contemplated are attained, as hereinafter more fully set forth, pointed out in my claims and illustrated in the accompanying drawings, in which:

Fig. 2 shows a top or plan view of the same.

Fig. 3 shows a transverse, vertical, sectional view taken on the line 3—3 of Fig. 1.

Fig. 4 shows a top or plan view of the cutting mechanism.

Fig. 5 shows a vertical, transverse, sectional view taken on the line 5—5 of Fig. 1.

Fig. 6 shows a sectional, detail view taken on the line 6—6 of Fig. 2.

Fig. 7 shows a sectional view taken on the line 7—7 of Fig. 2.

Fig. 8 shows a detail, sectional view of part of the movable carriage for the cutting mechanism.

Fig. 9 shows a detail view of another part of said carriage, and

Fig. 10 shows a sectional view taken on the line 10—10 of Fig. 3.

Figure 1:
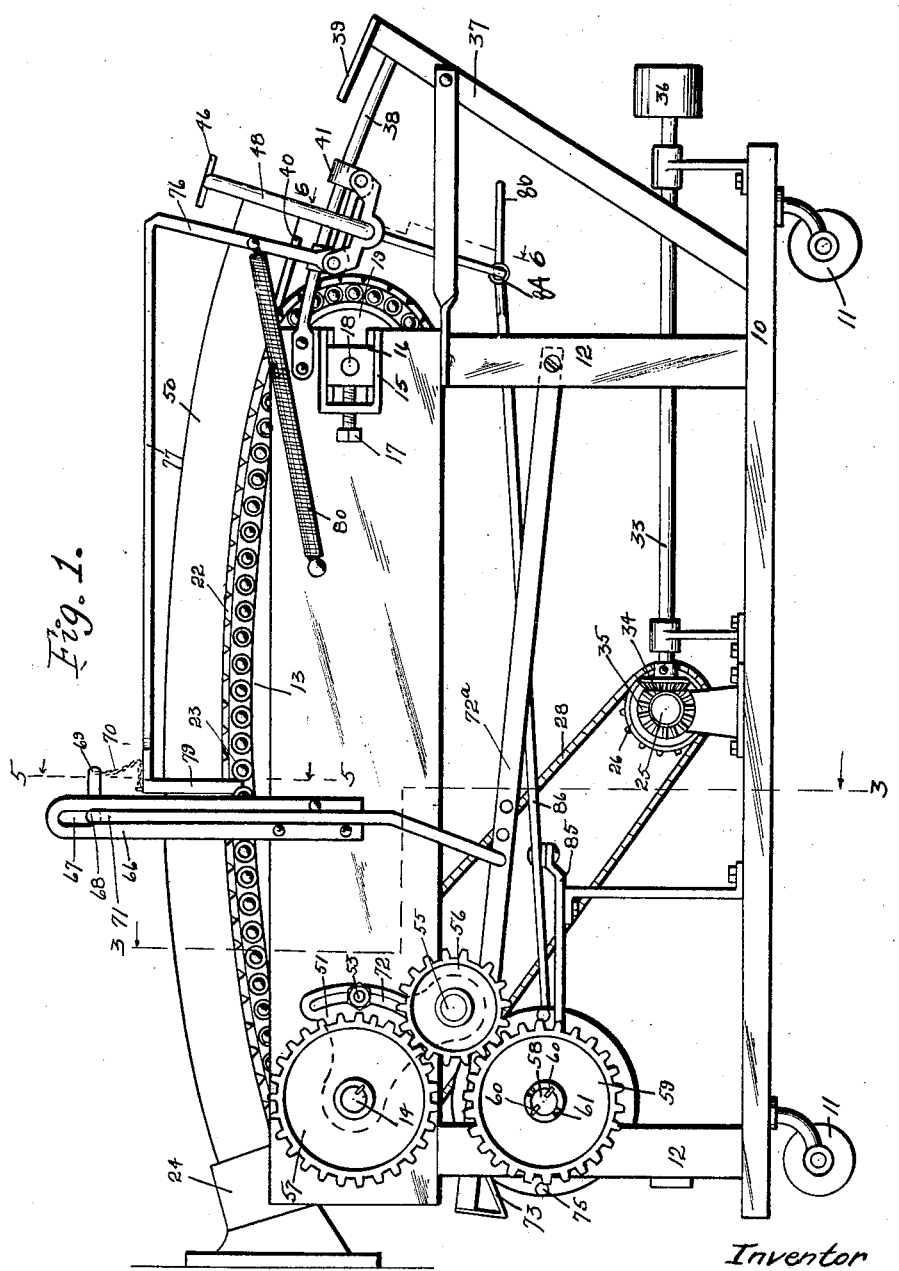
Figure 1 shows a side elevation of a tile cutting machine embodying my invention.

In the illustration of my invention, shown in the accompanying drawings, I have used the reference numeral 10 to indicate generally a frame mounted on caster wheels 11 and supporting the frame members 12 of my improved machine.

At the upper end of the frame members 12 there is supported spaced frame members 13 longitudinally of the machine and curved from end to end on the arc of any desired circle, as for instance, on the arc of a circle on the interior of an angular structure sixteen feet in diameter. When such curvature is provided the blocks cut on my machine would be suitable for circular structures of certain diameters and may be used in structures of considerably varied diameters.

Near and below the rear end of the members 13 is a transverse shaft 14. Near and below the forward end of the members 13 on opposite sides of the machine, are guide ways 15 in which are mounted bearing blocks 16 adjustably held in various positions by means of set screws 17.

Mounted in the bearing blocks 16 is a transverse shaft 18.

On the shaft 18, at opposite sides of the machine are sprockets 19 and on the shaft 14 at opposite sides of the machine are similar sprockets 20.

The respective sprockets 19 are in line with the respective sprockets 20. On the alined sprockets 19 and 20 are sprocket chains 21 forming part of an endless conveyer having the slats 22. On the slats 22 are rollers 23 which travel on the frame members 13, as illustrated in Fig. 15.

The rear end of the machine is designed to be placed adjacent to the discharge end of a die 24 for plastic material. The die 24 is of the well-known type which discharges the plastic material for forming a continuous smooth stock.

Mounted above the platform 10 is a transverse shaft 25 on which is a sprocket 26, in line with a sprocket 27 loosely mounted on the shaft 14. A chain 28 travels on the sprockets 26 and 27.

Formed on the sprocket 27 is a frictional clutch member 30 adapted to coact with a frictional clutch member 29 slidably but non-rotatably mounted on the shaft 18.

On the outer end of the shaft 18 spaced from but near to the clutch member 30 is an adjustable nut or the like 31. Between the nut 31 and the clutch member 30 is a coil spring 32. By means of the screw-threaded adjustment of the nut 31, the tension of the spring 32 may be varied for the purpose hereinafter to be mentioned.

Suitably mounted on the machine is a shaft 33 on which is a beveled gear 34, meshing with a beveled gear 35 on the shaft 25. On the shaft 33 is a belt pulley 36 or other suitable gearing device for connecting the shaft 33 with a suitable source of power. The entire machine may, of course, be anchored in any suitable way.

At the forward end of the endless carrier is a forwardly extending frame 37 connected to the main frame by the opposite spaced curved rods 38 arranged spaced from each other on opposite sides of the path of travel of the plastic material 39, having substantially the same curvature as the platform 13.

Supported by the frame 37 is a plate or the like 39 designed to receive material from the endless conveyer, and spaced from the plate 39 longitudinally of the machine, rearwardly from said plate, is a similar plate 40. A space is left between the plates 39 and 40 for permitting the operation of the cutting mechanism now about to be described.

Slidably mounted on the guide rods 38 is a cutter carriage having the brackets 41 which slide on said guide rods. Spaced transverse rods 42 connect the respective members 41 and project laterally on one side of the machine, as shown in Fig. 4.

Slidably mounted on the rods 42 are brackets 43, one of which is shown in Fig. 9. One of the brackets 43 is mounted between the respective brackets 41, and the other of the brackets 43 is mounted on the laterally extending portions of the rods 42 outside the guide members 38, as shown in Fig. 2.

The brackets 43 support and are connected together by the lower horizontal arm 44 of a laterally opening U-shaped yoke, which has also the upper arm 45.

The upper arm 45 is shorter than the lower arm 44 and is provided with a bar 46 arranged substantially longitudinally of the machine, and formed with a plurality of openings 47 spaced from each other longitudinally of the machine.

The arms 45 and 44 of the U-shaped yoke member are connected by the member 48.

The bar 46 is connected with the arm 44 by means of a cutting wire 49.

Means are provided for sliding the brackets 41 on the guide rods 38 and for simultaneously sliding the U-shaped yoke member, having the arms 44 and 45, laterally in the machine for using the wire 49 for cutting the clay 50 into tile, which means will now be described.

Pivotally mounted on the shaft 14 is a plate 51, shown partly in full lines and partly in dotted lines in Fig. 1. The plate 51 has a slot 72 elongated on the arc of a circle having its center at the center of the shaft 14. A bolt 53 secured to the frame of the machine and extended through the slot 72 serves as a guide and support for the plate 51, in its pivotal movement on the shaft 14. On the bolt 53 is a nut 53ª.

Rotatably mounted on a spindle or stub shaft 55 on the plate 51 is a pinion 56 in mesh with a pinion 57 on the shaft 14.

Suitably mounted on the frame of the machine below the shaft 14 is a transverse shaft 58 on which is a pinion 59 fixed against rotation on said shaft by keys 60 and held against removal from the shaft by means of a cotter pin 61 extended through said shaft. By screwing the nut 53ª tightly against the plate 51 said plate may be held in position for maintaining the pinion 56 in mesh with the pinions 57 and 59.

On the shaft 58 are fixed spaced disks 62 and 63, having on their adjacent faces near their peripheries laterally extending lugs 64 and 65 arranged on opposite sides of the shaft 58.

It will be seen that the gear 59 may be quickly and easily removed from the shaft 58 and a larger or smaller gear substituted, and by loosening the nut 53 the gear 56 may be easily made to mesh with such larger or smaller gear. By using different sizes of gears on the shaft 58 different speeds may be given to the shaft 58 relative to the speed or movement of the movable platform which carries the clay or plastic product 50.

Mounted on the frame of the machine on opposite sides of the endless carrier or platform, and extending upwardly above the endless platform are supporting arms 66 having in their upper ends vertically elongated slots 67 which register with each other. The lower end of one of said slots is indicated by dotted lines in Fig. 1.

Mounted in the slots 67 is a transverse rod 68 having at its central portion a ring or loop 69 to which is secured a chain 70.

Formed on one end of the rod 68 is a downward extension 71, which is pivoted at its lower end to a lever 72ª between the ends thereof. The forward end of the lever 72ª is pivoted on the frame 12, and the rearward end extends to position above the shaft 58, and is provided with an inclined member 73, shown in Fig. 1.

On the shaft 58 is a disk 74 having near its periphery opposite laterally extending pins 75, shown in Figs. 1 and 3.

The parts are so arranged that when the shaft 58 is rotated, the pins 75 will alternately engage the inclined member 73 of the lever 72ª for thereby raising the extension 71 and the rod 68.

Pivoted to one of the rods 42 are spaced upwardly extending arms 76, shown in Fig. 1.

Extending rearwardly from the upper ends of the arms 76 are rods 77 which are connected at their rear ends by a transverse member 78. The chain 70 is secured to the member 78, and when the rod 68 is in its lower position in the slots 67, and the brackets 41 are in their rearward positions, there is a certain amount of slack in the chain 70.

Near the ends of the member 78 are downwardly extending arms 79 the lower ends of which, when the chain is slack, project downwardly between successive rollers 23, as shown in Fig. 1.

Coil springs 80 are connected with the arms 76 and with the frame of the machine rearwardly therefrom, and tend to normally hold the arms 76 and the slidable carriage connected therewith at the rearward limit of their movement.

It will be seen that when the arms 79 are at the forward position of their movement, and that the machine is operated for moving the rollers 23 forwardly, said rollers will carry with them the arms 79, the frame members 77, the arms 76 and the movable carriage which supports the cutting wire supporting device.

A further description of the operation of the parts will be hereinafter set forth.

Secured to the rod 44 and extending downwardly therefrom is an arm 81 having in its lower end a downwardly, opening U-shaped yoke member 82 (Fig. 16). Between the ends of the yoke 82 is an elliptical ring 83, the opposite ends of which are connected with the respective ends of the yoke 82 by means of springs 84, all shown in Fig. 6.

Pivoted between its ends to a suitable supporting frame 85 is a long lever 86, one end of which extends through the elliptical ring 83 so as to have some lateral play therein, as shown in Fig. 6.

On the other end of the lever 85 is a roller 87 between the disks 62 and 63, and so located as to be engaged by the respective lugs 64 and 65 during the rotation of the shaft 58 and the disks 62 and 63.

In the practical operation of my improved tile cutting machine, the tile 50 is fed from the die 24 on to the endless carrier, as illustrated in Figs. 1 and 2.

In this connection it may be mentioned that the adjustment of the clutch members 29 and 30 is such that when the sprocket 27 is rotated, the power applied therefrom to the shaft 14 is barely sufficient to move the endless carrier without any load thereon.

It, therefore, follows, that when the plastic material 50 is fed on to the endless platform, the movement of the plastic material will determine the speed of movement of the endless carrier.

If the power applied to the sprocket 27 should be such as to tend to move the endless platform faster or slower than the movement of the plastic material 50, such material would still control the speed of the moving endless carrier and enough slippage of the clutch members would occur to permit such control.

The device is designed to be so arranged that the power applied through the clutch members to the endless carrier is sufficient to move the carrier when operated, so that the operation of the carrier imposes no additional burden on the plastic material feeding mechanism.

As the plastic material advances on the endless carrier, it reaches the plate 40 and then extends out beyond the plate 40 until it slides out over the plate or platform 39. It will be seen that as the endless carrier moves forwardly certain of the rollers of said carrier move with them the arms 79, the members 77, the arms 76, the members 41, the hanging brackets 43, and the U-shaped yoke member, which carries the cutting wire. The parts are also so arranged that during such forward movement of the cutting wire, the roller 87 is engaged by one of the lugs 64 or 65 for swinging the lever 85 laterally in the machine on its pivot point, and thereby swinging the collar 83 and the arm 81 laterally for carrying the yoke having the arms 44 and 45 laterally and causing the tile 50 to be cut transversely by the wire during its forward movement in the machine. The springs 84 cushion the movement of the lever 86, so that a quick movement of said lever may impart a steady push to the yoke 82 and the arm 81 and the cutting wire 49.

The inclination of the wire 49, shown in Figs. 2 and 4, is such that the tile blocks may be cut on the radial lines of the proper circle. By selectively mounting the wire 49 in different holes 47 the blocks may be cut on different angles.

When the moving carriage, which supports the cutting wire, has reached a certain position in its forward movement, one of the pins 75 engages the inclined member 73, thereby raising the rearward end of the arm 72$^a$ and raising the member 71 and the member 68 until the chain 70 is tightened for lifting the arms 79 away from the rollers 23, whereupon the springs 80 will draw the wire supporting carriage rearwardly in the machine with a quick movement, which movement occurs just after the roller 87 has cleared one of the lugs 64 or 65.

After the wire supporting carriage has moved rearwardly, the pin 75, which has engaged the member 73, leaves the said member, and permits the lowering of the end of the arm 72 and the members 68 for permitting the arms 79 to drop downwardly to position where they are again engaged by certain of the rollers 23. The operation of the machine is repeated.

It will be seen that during the successive cutting movements of the wire, the wire first moves in one direction, for instance, toward the left in the machine, and then in the opposite direction, for instance, toward the right.

During each forward movement of the carriage, which supports the wire, said wire is moved transversely across the machine so as to cut off one tile.

In Fig. 9, I have shown the carriage, which supports the cutting wire in full lines in one of its positions, and in dotted lines in another of its positions.

The plastic material has sufficient strength and rigidity, so that it will move across the plates 40 and 39, and then transversely over the plate 39 to the forward or discharge end of the machine.

Insomuch as both the forward movement of the carriage, which supports the wire, and the transverse movement of the cutter wire are both determined by the speed of movement of the plastic material, it will readily be seen that the material is cut on proper transverse lines.

It will also be seen that the wire, during the cutting movement, may be made to stand substantially at right-angles to the outer and inner surfaces of the tile, so that the tile may be cut with the proper beveled edges for assembling the tile in a circular structure.

I prefer to cut the blocks transversely, as hereinbefore described, for the reason that when the blocks are cut with a wire it is sometimes true that a ragged edge is left where the wire leaves the plastic material.

It is not desirable to have such a ragged edge on the inside of the block, for the reason that the blocks are frequently used in making a silo in which a smooth interior is required.

It may be mentioned in this connection that by changing the size of the pinion 59, the operation of the tile cutting mechanism may be varied so as to cut the tile in different lengths. This is accomplished by varying the speed or rotation of the shaft 58 and the parts mounted thereon.

Some changes may be made in the arrangement and construction of the various parts of my improved tile cutting machine without departing from the essential features and purposes thereof, and it is my intention to cover by this application any such changes which may be included within the reasonable scope of my claims.

I claim as my invention;

1. In a device of the class described, a frame, an endless carrier thereon, a power shaft, means for operatively connecting the power shaft with the endless carrier, said means including a clutch adapted to permit slippage, so that when plastic material is fed upon said endless carrier from a die or the like, the speed of the endless carrier may be regulated according to the movement of the plastic material from the die, means for transversely cutting plastic material discharged from said carrier, said last means including a carriage adapted to reciprocate adjacent to the path of travel of plastic material being discharged from said endless carrier, a transversely movable cutting device on said carriage, and means for intermittently connecting said carriage with said endless carrier.

2. In a device of the class described, a frame, an endless carrier thereon, a power shaft, means for operatively connecting the power shaft with the endless carrier, said means including a clutch adapted to permit slippage, so that when plastic material is fed upon said endless carrier from a die or the like, the speed of the endless carrier may be regulated according to the movement of the plastic material from the die, means for transversely cutting plastic material discharged from said carrier, said last means including a carriage adapted to reciprocate adjacent to the path of travel of plastic material being discharged from said endless carrier, a transversely movable cutting device on said carriage, and means for intermittently connecting said carriage with said endless carrier, and for disconnecting it from said endless carrier, and means for returning the carriage when it is so disconnected.

3. In a machine of the class described, an endless carrier, means for supporting the upper stretch of the endless carrier whereby it may travel on a curved path corresponding generally to the curvature of blocks to be manufactured, means for cutting off blocks from material traveling on said platform, said means including a cutting member, and means for actuating said cutting member whereby the blocks may be cut on radial lines.

Des Moines, Iowa, August 14, 1917.

CLYDE A. THORPE.

Copies of this patent may be obtained for five cents each, by addressing the "Commissioner of Patents, Washington, D. C."